(12) United States Patent
Axelsson et al.

(10) Patent No.: US 8,281,743 B2
(45) Date of Patent: Oct. 9, 2012

(54) MILKING PARLOUR AND METHOD FOR OPERATING THE SAME

(75) Inventors: Thomas Axelsson, Farsta (SE); Uzi Birk, Huddinge (SE)

(73) Assignee: DeLaval Holding AB, Tumba (SE)

( * ) Notice: Subject to any disclaimer, the term of this patent is extended or adjusted under 35 U.S.C. 154(b) by 70 days.

(21) Appl. No.: 12/738,989

(22) PCT Filed: Nov. 17, 2008

(86) PCT No.: PCT/GB2008/003858
§ 371 (c)(1),
(2), (4) Date: Apr. 21, 2010

(87) PCT Pub. No.: WO2009/063228
PCT Pub. Date: May 22, 2009

(65) Prior Publication Data
US 2010/0307420 A1 Dec. 9, 2010

(30) Foreign Application Priority Data
Nov. 16, 2007 (EP) .................................... 07254501

(51) Int. Cl.
*A01J 5/00* (2006.01)
*A01K 1/12* (2006.01)

(52) U.S. Cl. .................................. 119/14.02; 119/14.04

(58) Field of Classification Search ..... 119/14.01–14.04
See application file for complete search history.

(56) References Cited

U.S. PATENT DOCUMENTS

| 1,787,152 | A | * | 12/1930 | Hapgood | 119/14.04 |
|---|---|---|---|---|---|
| 4,508,058 | A | | 4/1985 | Jakobson et al. | |
| 6,394,029 | B1 | * | 5/2002 | Bowers | 119/14.18 |
| 6,450,118 | B1 | * | 9/2002 | Eppers, Jr. | 119/14.53 |
| 6,883,461 | B2 | * | 4/2005 | Christensen | 119/14.02 |
| 7,104,218 | B2 | * | 9/2006 | Teckentrup et al. | 119/14.02 |
| 2002/0033138 | A1 | | 3/2002 | Brayer | |
| 2003/0150389 | A1 | * | 8/2003 | Christensen | 119/14.02 |
| 2004/0050331 | A1 | * | 3/2004 | Hein et al. | 119/14.04 |
| 2005/0166851 | A1 | * | 8/2005 | Holscher et al. | 119/14.04 |
| 2009/0320758 | A1 | * | 12/2009 | Barba et al. | 119/14.02 |

FOREIGN PATENT DOCUMENTS

| EP | 0 091 892 | 10/1983 |
|---|---|---|
| EP | 0 689 762 | 1/1996 |
| EP | 1 474 970 | 11/2004 |
| WO | 00/74472 | 12/2000 |

OTHER PUBLICATIONS

International Search Report dated Jun. 5, 2009, from corresponding PCT application.
Examination Report, dated Jul. 21, 2011, in New Zealand Patent Application No. 584238.

* cited by examiner

*Primary Examiner* — Rob Swiatek
*Assistant Examiner* — Ebony Evans
(74) *Attorney, Agent, or Firm* — Young & Thompson

(57) ABSTRACT

An apparatus for milking an animal provides a milking parlor (1) with a robotic manipulation device (25) and a milking stall (5) provided on a platform (3) moveable relative to the robotic manipulation device (25). An electric control system is adapted to vary the movement of the platform in response to the performance of the robotic manipulation device (25) in servicing the milking stall (5).

17 Claims, 3 Drawing Sheets

MILKING PARLOUR AND METHOD FOR OPERATING THE SAME

The present invention relates to a milking parlour and a method for operating the same and particularly, but not exclusively to a rotary milking parlour for milking an animal, such as a cow, and to a method for operating the same.

There are various types of milking parlour known in the dairy industry and the present invention is of particular relevance to what is commonly referred to as a rotary milking parlour. This type of parlour is provided with a comparatively large number of milking stalls arranged in a circular configuration on a rotating annular platform and is of particular use in handling a large number of animals. The platform rotates at a relatively low constant speed so that a cow may readily step onto the platform from a stationary holding bay and thereby gain access to a stall. If deemed necessary by an operator, the rotary movement of the platform may be stopped momentarily in order to allow a cow sufficient time to enter (or exit) the platform. The continued rotation of the platform then moves the stall into a position where an operator can perform certain tasks (such as teat cleaning and placement of teat cups on the teats) so as to allow the milking process to begin. The speed of rotation is such that the milking process will have been completed by the time a stall has moved from the cow entry position (where a cow gains entry onto the platform) to a cow exit position (where a cow is permitted to leave the platform). The cow entry and exit points are adjacent one another so as to maximise the time a cow spends in the milking stall.

It will be understood that cows may constantly enter and exit a rotary parlour without necessarily stopping the platform rotation and this allows for a large number of cows to be handled. It will be also understood that the movement of the platform results in cows being brought to an operator in turn. The operator is therefore able to remain in one location and concentrate on essential milking tasks without interruptions.

There are two main types of rotary milking parlour system, which may be referred to as the Parallel Rotary system and the Herringbone Rotary system.

In a Herringbone Rotary system, a cow stands in a stall facing diagonally towards the outside of an annular rotating platform, in the general direction of rotation. One or more operators stand on the inside of the rotating platform and are thereby provided good access to the side of each cow. Milking equipment is positioned alongside each cow on the inside edge of the platform.

In a Parallel Rotary system, a cow stands in a stall of a rotating platform so as to face radially inward towards the centre of rotation of the platform. Operators stood outside the rotating platform are then able to work from the rear of each cow as the cow passes in turn. Because the cows are positioned side by side, the parallel rotary system allows more cows to be accommodated in the same space.

In each of these types of rotary parlour, each milking stall is provided with a cluster of four teat cups. These teat cups are attached to the teats of a cow located within the stall so as to allow said cow to be milked. Once the milking process has been completed, an automatic retraction system is typically used to remove the four teat cups simultaneously from the teats. Such a system comprises a cord which is attached to the teat cup cluster and which is retracted automatically at an appropriate time so as to pull the teat cup cluster from the cow.

A problem associated with rotary milking parlours is that an operator only has a limited amount of time in which to service a milking stall before the milking stall moves beyond the reach of the operator. An operator may service a milking stall in a number of ways, for example, an operator will typically service a milking stall by moving teat cups from a storage position into a position where they are attached to the teats of a cow stood within the milking stall. Although a teat cup cluster will typically be attached to the teats of a cow before the milking stall has moved a significant distance, unpredictable events such as movement by an unsettled cow can, on occasions, significantly delay the teat cup attachment process. This is not necessarily problematic when the milking stalls are serviced by a human operator because the operator can walk with the rotating platform and remain with the particular stall experiencing the delay. However, delays in servicing a stall can be problematic in circumstances where a robot arm is being used for the servicing activity. This is because the robot arm has a fixed position within a milking parlour and so a milking stall will tend to move quite rapidly beyond its reach.

The present invention provides a milking parlour comprising a robotic manipulation device and a milking stall provided on a platform moveable relative to the robotic manipulation device; characterised by an electronic control system adapted to vary the movement of the platform in response to the performance of the robotic manipulation device in servicing the milking stall.

A further aspect of the present invention provides a method of operating a milking parlour having a robotic manipulation device and a stall provided on a platform moveable relative to the robotic manipulation device, the method comprising the step of varying the movement of the platform in response to the performance of the robotic manipulation device in servicing the milking stall.

A yet further aspect of the present invention provides a milking parlour comprising a moveable platform on which a milking stall is provided; and a system for monitoring movement of the platform, the movement monitoring system comprising detector means and a repeating pattern which moves past the detector means in response to movement of the platform, wherein the detector means is adapted to detect the repetition in the repeating pattern.

Accordingly, through use of the present invention, automated means may be used for servicing a milking stall (for example, for attaching teat cups to the teats of a cow within a milking stall) even in circumstances where an unexpected event delays the servicing process. For example, where a robot arm is servicing a milking stall by moving teat cups into attachment with the teats of an animal and this process is delayed because the animal repeatedly moves within the milking stall, then the control system of the present invention may slow and even stop the movement of the platform so as to provide the robot arm with sufficient time to complete the servicing process.

Further advantageous optional features of the invention are set out in the appended dependent claims.

An embodiment of the present invention will now be described with reference to the accompanying drawing, in which.

Figure 1:
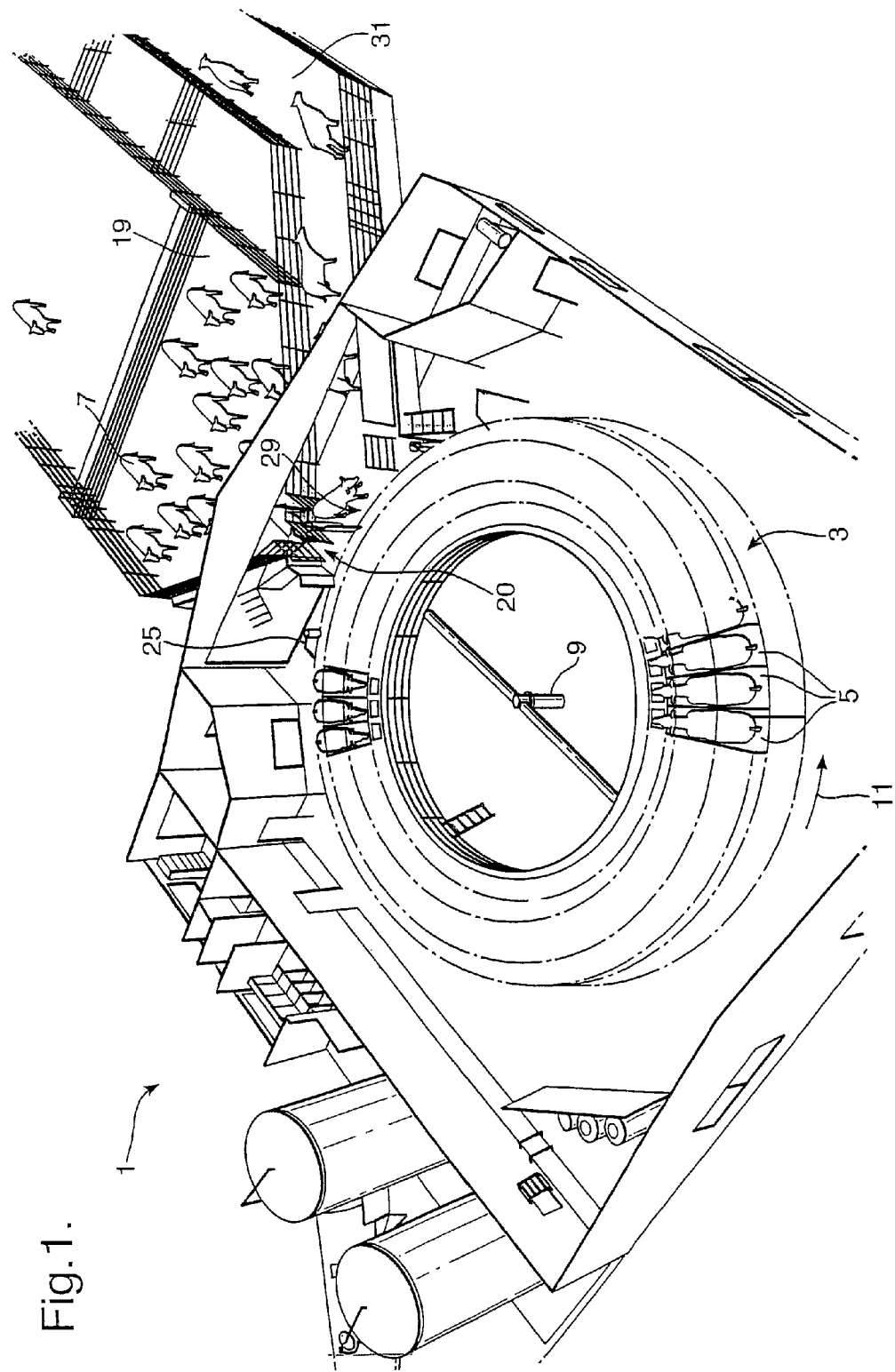
FIG. 1 is a schematic perspective view of a parallel rotary parlour according to the present invention.

A parallel rotary parlour 1 according to the present invention is shown in FIG. 1 of the accompanying drawings. The parlour 1 comprises a rotatable platform 3 having an annular shape and being provided with fifty milking stalls 5 arranged side by side circumferentially along the platform 3. Since the parlour 1 is of a parallel rotary type, the stalls 5 are arranged so that a cow 7 to be milked stands in a stall 5 facing radially inwards towards the centre 9 of rotation of the platform 3.

The platform 3 is rotated in an anti-clockwise direction as indicated by arrow 11. This rotation is driven by means of a rotating wheel 13 which abuts a circumferential edge 15 of the platform 3 (see FIG. 2). Specifically, in the embodiment shown in the accompanying drawings, the drive wheel 13 abuts a radially outer circumferential edge of the rotatable platform 3 and rotates in a clockwise direction as indicated by arrow 17. The wheel 13 is provided with a tyre so as to assist in gripping the edge 15 of the platform 3 and thereby ensure an efficient transfer of rotary drive from the wheel 13 to the platform 3.

With reference to FIG. 1, it will be understood that cows 7 to be milked congregate in a holding bay 19 and walk onto the platform 3 one by one at a stall entry point 20. It will be understood that the speed of rotation of the platform 3 is sufficiently low for a cow 7 to step onto the platform 3 and walk into a passing stall 5. It will also be understood that, once a cow 7 has entered a stall 5, further rotation of the platform 3 closes the stall 5 so as to prevent the cow 7 from backing out of the stall 5. Each stall 5 is provided with four teat cups connected to a conventional milking system by means of hoses. As will be explained in more detail below with reference to FIG. 2, these teat cups 21a, 21b, 21c, 21d are automatically attached to the teats 23a, 23b, 23c, 23d of a cow by means of a robot arm 25 which is moved by an electronic control system. Once the teat cups 21 are attached to the teats 23, the cow 7 is milked in a conventional fashion whilst the platform 3 continues to rotate. Once milking has been completed, the teat cups 21 are removed from the teats 23 by means of an automatic teat cup retraction system (not shown) which pulls on the hose associated with each teat cup 21 and withdraws the teat cups 21 back into a teat cup magazine 27.

Each stall 5 is provided with a teat cup magazine 27 which comprises four recesses into which the four teat cups 23 locate when not in use. Each magazine 27 is located adjacent the entrance of the associated stall 5 so as to not unduly hinder access by a cow 7 to the stall 5 and so as to be positioned adjacent the rear of a cow 7 stood in the stall. The magazine 27 will therefore be understood to hold the teat cups 21 in a known storage position which is readily accessed by the robot arm 25 and which is sufficiently close to the teats 23 of the cow 7 to allow ready movement of the teat cups 21 to the teats 23 from the magazine 27.

Once the teat cups 21 have been retracted into the teat cup magazine 27, the milking stall 5 in which the cow 7 is located will shortly thereafter move to a stall exit point 29 (see FIG. 1). At the exit point 29, a stall 5 is arranged in an open configuration so that a cow 7 located therein may back out of the stall 5 and leave the parlour 1 by means of an exit walkway 31.

As mentioned above, the rotary parlour 1 of the present invention is provided with an automated system for attaching teat cups 21 to the teats 23 of a cow 7 to be milked. This automated system comprises a robot arm 25 and an electronic control system. The electronic control system allows movement of the robot arm 25 to be coordinated with the rotary movement of the platform 3. More specifically, the control system varies the speed of rotation of the platform 3 (by varying the speed of the wheel 13) depending upon the rate at which the robot arm 25 attaches teat cups 21 to the teats 23. Accordingly, if the robot arm 25 requires more time than the current platform rotation speed allows in order to attach all four teat cups 21 to the teats 23 of a cow 7, then the electronic control system will slow the rotation of the platform 3 to allow the robot arm 25 additional time before the teat cups 21 and/or teats 23 move beyond the reach of the robot arm 25. If necessary, it will be understood that the electronic control system will stop the platform 3 rotation before the teat cups 21 and/or teats 23 move beyond the reach of the robot arm 25 so as to ensure the robot arm 25 is able to complete the teat cup attachment process. Accordingly, the platform 3 rotation speed is determined by the performance of the robot arm 25 and controlled by a closed loop feedback circuit. Once the robot arm 25 has attached all four teat cups 21 to the teats 23 after having slowed or stopped the platform rotation, the platform 3 will be slowly accelerated back to its original rotation speed. Alternatively, rather than accelerating the platform 3 back to its original rotation speed, the platform 3 may be accelerated to a speed less than the original rotation speed in the event that the control system determines the original rotation speed to be too high in the circumstances.

Figure 2:
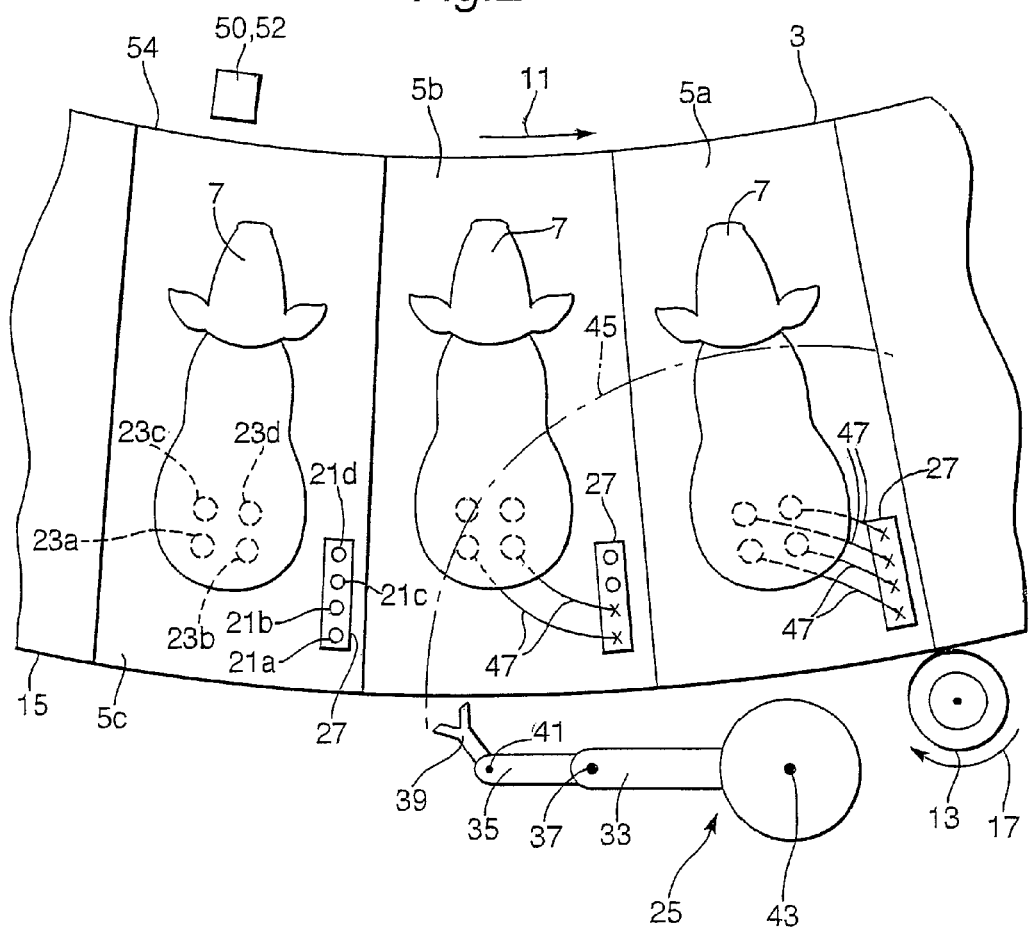
FIG. 2 is a schematic part plan view of the rotating platform of the parlour shown in FIG. 1 wherein a robotic arm is moving teat cups one by one from a teat cup magazine to the teats of a cow.

In FIG. 2 of the accompanying drawings, three milking stalls 5a, 5b, 5c are shown moving past the robot arm 25. Alternative arrangements of robot arm 25 may be provided and the schematic example shown in FIG. 2 is provided merely for the purposes of illustrating the operation of the present invention. Specifically, the robot arm 25 shown in the accompanying drawings comprises first and second arms 33, 35 rotatably connected relative to one another by means of an elbow joint 37. A teat cup gripper 39 for selectively gripping and releasing a teat cup is pivotally connected to the second arm 35 at a wrist joint 41. The robot arm 25 remains in a fixed location relative to the platform 3 but is nevertheless rotatable relative thereto about a central axis 43. As shown in FIG. 2, the robot arm 25 is arranged in a fully extended configuration and the full reach of the teat cup gripper 39 when the robot arm rotates about the central axis 43 is indicated by arc 45.

With reference to FIG. 2, it will be understood that the third milking stall 5c has yet to move within reach of the robot arm 25. In contrast, the first illustrated milking stall 5a has been within reach of the robot arm 25 for a sufficient length of time for all four teat cups 21 to have been moved by the robot arm from the teat cup magazine 27 to the teats 23 of the cow 7. Teat cup hoses 47 are shown extending from the magazine 27 to the teat cups 21 attached to the teats 23.

With reference to the second milking stall 5b shown in FIG. 2, it will be understood that the teat cups 21 and teats 23 have only been within reach of the robot arm 25 sufficiently long for the first two teat cups 21a, 21b to be attached to the cow's teats 23a, 23b. The control system is such that the robot arm 25 grasps a teat cup 21 at the earliest opportunity as soon as the magazine 27 moves within its reach. The grasped teat cup is then pulled from the magazine 27 and attached to a teat 23 (e.g. the first teat 23b to move within the reach of the gripper indicated by arc 45). The remaining teat cups 21 are then moved in turn by the robot arm 25 from the magazine 27 to the remaining three teats 23.

As explained in more detail below, the electronic control system continuously or repeatedly monitors the platform in real-time. The electronic control system monitors the speed and direction of rotation of the platform 3 and also monitors the precise position of the platform 3. This information is used to determine the position of any one teat cup held by a teat cup magazine 27 so that the robot arm 25 may move directly to the magazine 27 and grasp a teat cup from the magazine 27 (perhaps with the assistance/guidance of a proximity sensor once the robot arm has moved to the locality of the teat cup magazine 27).

The parlour 1 is optimised so that the teat cups 21 and teats 23 associated with a particular stall 5 remain within reach of the robot arm 25 only for the average time it takes for all four teat cups to be attached to a cow 7. This is achieved by setting the platform rotation speed at a particular level. Thus, it will be understood that the final teat cup is generally attached just before the final free teat moves out of reach of the robot arm 25. Alternatively, the rotation speed and arm length may be such that the robot arm 25 completes the servicing of a stall (i.e. completes the teat cup attachment process) just as the next stall moves within reach of the robot arm 25. However, if the electronic control system determines that a particular teat cup has not been attached to its respective teat by the time the milking stall 5 has moved to the relevant predetermined position relative to the robot arm 25, then the speed of the platform rotation is reduced sufficiently for the robot arm 25 to revert back to the predefined schedule.

As explained above, the electronic control system may slow or stop the platform 3 in order to ensure a teat cup is attached to a teat in accordance to a particular attachment schedule. For example, it will be understood that, a teat cup attachment schedule may allow the robot arm 25 to delay attaching the final teat cup for as long as possible. In other words, the attachment schedule may require the final teat cup to be attached to the final free teat at a point just before that teat moves beyond the reach of the robot arm 25. If the electronic control system determines that attachment has not been made, then the platform 3 will be stopped by the control system. Ideally, the electronic control system will first slow the platform rotation speed in order to provide the robot arm 25 with additional time for attaching the teat cup. If further time is required, then it will be understood that the platform may then be stopped (although it is generally preferred to avoid stopping the platform if possible). In this way, the electronic control system may accommodate delays in attaching a teat cup to a teat which may be caused by unpredictable events such as movements of a cow within a stall.

More specifically, the electronic control system may store a predefined schedule indicating by when (in terms of milking stall and/or teat position relative to the robot arm) a particular teat cup should be attached to a teat in order for the risk of a teat cup not being attached (before the teats move beyond the reach of the robot arm) to remain acceptable. Provided the risk of a teat cup not being attached to a teat remains acceptable, then the control system will maintain the speed of the platform. If any one of the teat cups is not attached in accordance with the schedule, then the speed of the platform is reduced by the control system. The control system may progressively further reduce the platform speed until the teat cup has been attached. It will be understood therefore that the performance of the robot arm in attaching teat cups in accordance with the teat cup attachment schedule is constantly monitored. If the schedule is not complied with, then corrective action is taken by the control system.

It will be further understood that, during the attachment process, the location of a particular teat is determined in a conventional manner through use of appropriate sensing devices so that the robot arm 25 may identify a teat location and accurately complete the teat cup attachment.

It is mentioned above that the electronic control system monitors the speed and direction of rotation of the platform 3 and also monitors the precise position (i.e. angular position) of the platform 3. This allows the position of any one teat cup held in the teat cup magazine 27 to be more accurately determined and also allows the robot arm to move a teat cup to an approximated initial position adjacent the teat of a particular cow stood in the stall 5. The system monitors the movement of the platform 3 itself rather than movement of the drive wheel 13 and/or associated drive train. This is because there can be a tendency for the drive wheel to slip relative to the platform 3. Accordingly, the actual platform speed and position will generally not be accurately determined from monitoring movement of the drive wheel 13.

The electronic control system monitors movement of the platform 3 itself by means of two cameras 50, 52 located one above the other adjacent a radially inner circumferential edge 54 of the platform 3 (see FIG. 2). The two cameras 50, 52 are each arranged to view a different one of two marker strips 56, 58 which are each provided on the inner edge 54 and extend circumferentially along the entire length of the inner edge 54 to form a closed loop (see FIG. 3). The two marker strips 56, 58 are provided one above the other on the inner edge 54 and each comprise an identical repeating pattern which is viewed by one of the cameras 50, 52. Also, the identical repeating patterns of the two marker strips 56, 58 are offset relative to one another. This offsetting of the two repeating patterns allows the direction of rotation of the platform 3 to be determined from a comparison of signals generated by the two cameras 50, 52 in response to the two marker strips 56, 58.

One of the marker strips 56, 58 also may be provided with a unique irregularity in the repeated pattern. Accordingly, since this irregularity occurs at only one position along the circumference of the inner edge 54, it will be understood that the platform 3 will be in a particular rotary position when the irregularity is detected by one of the cameras 50, 52. In this way, the precise position of the platform 3 can be determined upon every complete rotation of the platform.

Figure 3:
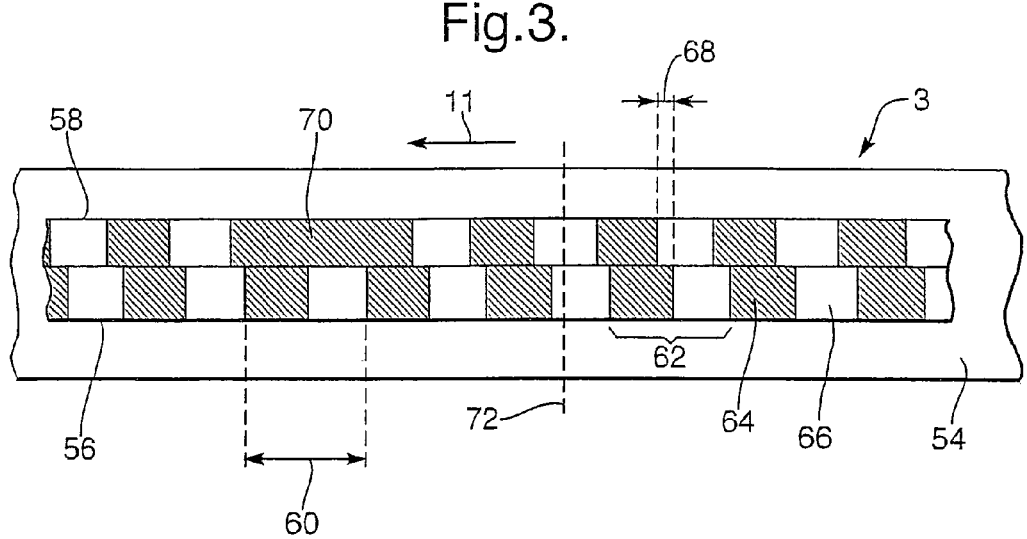
FIG. 3 is a schematic side view of the rotating platform of FIG. 2 and a movement monitoring system for monitoring movement of the platform.

With reference to FIG. 3, a portion of the inner edge 54 of the platform 3 is shown provided with an upper marker strip 58 and a lower marker strip 56. Each marker strip 56, 58 is provided with a repeating pattern 62 comprising a comparatively dark portion 64 and a comparatively light portion 66. The contrast between the two portions 64, 66 is such that the two portions 64, 66 may be distinguished from one another by a camera 50, 52. The two portions 64, 66 have identical circumferential length and the offset 68 of the pattern between the upper and lower marker strips 56, 58 is one eighth of a pattern length 60. Also, an irregularity in the repeated pattern of the upper marker strip 58 is provided by a comparatively dark portion 70 having a circumferential length three times that of the dark portion 64 of the regular pattern 62.

During operation of the platform, the first camera 50 views the lower marker strip 56 and the second camera 52 views the upper marker strip 58. Both cameras 50, 52 view the strips 56, 58 at the same circumferential position 72 along the edge 54 of the platform, as shown in FIG. 3. Accordingly, it will be understood that, if the platform 3 rotates in the direction indicated by arrow 11 in FIG. 3, then a dark portion 64 of the upper marker strip 58 will be detected by the upper camera 52 before a dark portion 64 of the lower marker strip 56 is detected by the lower camera 50. If the direction of rotation of the platform 3 is in the opposite direction to that indicated by arrow 11, then the lower camera 50 will detect a dark portion 64 before the upper camera 52 detects a dark portion 64. Accordingly, it is possible for the electronic control system to determine the direction of rotation of the platform 3 from the signals produced by the two cameras 50, 52. Also, since the dark portions 64 of the lower marker strip 58 are consistently spaced by the same known distance (i.e. by the comparatively light portions 66), the rate at which consecutive dark portions 64 are detected by the lower camera 50 allows the speed of rotation of the platform 3 to be determined by the electronic control system.

In addition, the detection of two dark portions 64 by the lower camera 50 when only a single dark portion has been detected by the upper camera 52 indicates that the upper camera 52 has detected the irregularity 70 in the repeating pattern of the upper marker strip 58 and this indicates to the electronic control system the precise position of the platform 3. Accordingly, the location of a particular teat cup magazine 27 relative to the robot arm 25 may be determined and the need to adjust the speed of rotation may be calculated. If necessary, the direction of platform rotation may even be reversed.

Figure 4:
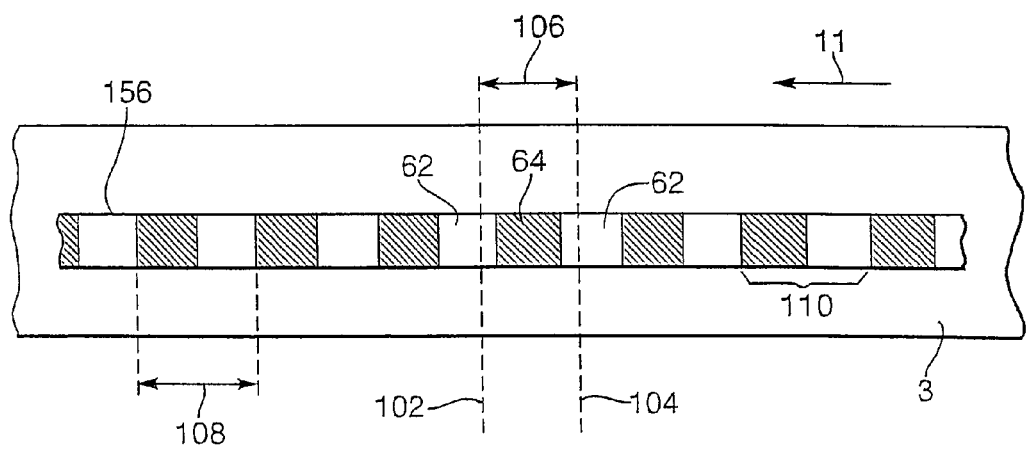
FIG. 4 is a schematic side view of the rotating platform of FIG. 2 provided with an alternative movement monitoring system for monitoring movement of the platform.

In an alternative electronic control system shown in FIG. 4, the two cameras 50, 52 are located side by side rather than one above the other. The arrangement is such that the first camera 50 monitors a particular first location 102 past which a single marker strip 156 (mounted on the platform 3) moves upon rotation of the platform 3, and the second camera 52 monitors a particular second location 104 past which the marker strip 156 also moves upon rotation of the platform 3. The first and second locations 102, 104 are spaced from one another by a distance 106 which is not wholly divisible by the length 108 of a single repeating pattern 110 or by a whole multiple of said length 108. In other words, the distance 106 between the two locations 102, 104 is not equal to the length 108 of a single repeating pattern or a whole number multiple thereof (said distance 106 should not be equal to: pattern length×n; wherein n is a whole number, i.e. pattern length×1, pattern length×2, pattern×3, etc . . . ). In the particular embodiment shown in FIG. 4 of the accompanying drawings, the two cameras 50, 52 monitor locations 102, 104 spaced by a distance 106 equal to one and a half times the length 108 of a repeating pattern. The cameras 50, 52 could, however, be positioned so as to monitor locations spaced by a far greater distance than this, provided that this distance is not wholly divisible by a whole multiple of a pattern length, as mentioned above. For example, the two cameras 50, 52 could be positioned at approximately diametrically opposite positions relative to the platform 3.

It will be understood that, since the length 108 of a repeating pattern 110 is known, the control system may be adapted to determine the speed with which the marker 156 passes a location 102, 104 by reference to the rate at which either one of the cameras 50, 52 detects the movement of repeating patterns 110 past the relevant monitored location 102, 104.

It will also be understood that the control system may be adapted to determine the direction of movement of the marker 156 and, accordingly, the direction of movement of the platform 3, by comparing what is being monitored at the first location 102 with what is being monitored at the second location 104. For example, with reference to FIG. 4, it will be seen that the platform 3 is positioned such that each camera 50, 52 will detect a light portion 62 of the marker strip 156. Upon movement of the platform 3 in the direction indicated by arrow 11, it will be understood that the dark portion 64 located between said two light portions 62 will move towards the first location 102 and, accordingly, into the viewing field of the first camera 52. The control system would then determine from a comparison of the signals generated by the cameras 50, 52 that a dark portion 64 has moved into the first location 102 whilst a light portion 62 of the marker strip 156 remains in the second location 104. On this basis, the control system will be able to deduce that the platform 3 has moved in the direction indicated by arrow 11. Alternatively, if the platform moves in a direction opposite to that indicated by arrow 11, then the dark portion 64 located between said two light portions 62 will be detected by the second camera 52 monitoring the second location 104, whilst the first camera 50 will continue to detect merely a light portion 62 of the marker strip 156 at the first location 102. This different result from a comparison of the signals generated by the cameras 50, 52 distinguishes opposite movements of the platform 3.

It will be understood that, although two separate cameras 50, 52 have been described in relation to the systems shown in both FIGS. 3 and 4, the locations at which the or each marker strip is monitored may be arranged sufficiently close to one another as to fall within the field of view of a single camera. A person skilled in the art will appreciate that a suitable electronic control system will be capable of differentiating between the two locations being monitored, despite this monitoring being achieved with a single camera.

Although the repeating pattern of the above system has been described in terms of light and dark portions 62, 64 detected by one or more cameras, it will be understood that a pattern may be provided by different means and/or monitored by a detector/sensor other than a camera. For example, the light portions may be provided by means of one or more light emitting diodes (LED) and detected by means of a photoelectric cell in place of the aforementioned cameras. Alternatively, the repeating pattern may be generated by a plurality of inductive sources (for example, magnets) for inducing electric pulses in a detector comprising an inductive circuit. In other words, a transducer is provided which provides an electric signal indicative of the rotation (e.g. both speed and direction) of the rotary platform.

The present invention is not limited to the specific embodiments described above. Alternative arrangements will be apparent to a reader skilled in the art. For example, the position of the platform 3 may be determined through the provision of markers separate to the marker strips 56, 58. Each of these additional markers may be unique and placed at various positions along the circumference of the platform. In this way, detection of any one of the additional markers will allow the position of the platform to be determined. The markers may, for example, be numbers associated with each adjacent stall and which are detected by a camera and an associated electronic recognition system.

The invention claimed is:

1. A milking parlour, comprising:
   a robotic manipulation device;
   a milking stall provided on a platform moveable relative to the robotic manipulation device; and
   an electronic control system i) adapted to monitor a rate at which the robotic manipulation device attaches teat cups to teats of an animal positioned in the milking stall, and ii) adapted to vary a speed of rotation of the platform in dependence upon the monitored rate at which the robotic manipulation device attaches the teat cups to the teats of the animal, wherein,
   the stall comprises four teat cups, and
   the electronic control system:
   i) determines, based on a current speed of the platform, that the monitored rate at which the robotic manipulation device has attached some of the four teat cups is insufficient to attach all four of the teat cups to the animal before the animal moves out of reach of the robotic manipulation device, and
   ii) in response to the determination, and based on the monitored rate at which the robotic manipulation device has attached some of the four teat cups, the electronic control system reduces the speed of rotation of the platform to a non-zero value to provide sufficient time for the robotic manipulation device to attach all four of the teat cups to the animal before the animal moves out of reach of the robotic manipulation device.

2. A milking parlour, comprising:
a robotic manipulation device;
a milking stall provided on a platform moveable relative to the robotic manipulation device; and
an electronic control system i) adapted to monitor a rate at which the robotic manipulation device attaches teat cups to teats of an animal positioned in the milking stall, and ii) adapted to vary a speed of rotation of the platform in response to the monitored rate at which the robotic manipulation device attaches teat cups to teats of an animal positioned in the milking stall, wherein,
the stall comprises four teat cups, and
the electronic control system
i) determines that, based on a current speed of the platform, the monitored rate at which the robotic manipulation device has attached some of the four teat cups is insufficient for all four of the teat cups to be attached to the animal before the animal moves out of reach of the robotic manipulation device, and
ii) in response to the determination, the electronic control system reduces the speed of rotation of the platform.

3. A milking parlour according to claim 2, wherein the electronic control system is adapted to reduce the speed at which the platform moves in response to a determination that, in use, the milking stall has moved to a predetermined position relative to the robotic manipulation device without a predetermined teat cup having been attached to a teat of a cow standing in the milking stall.

4. A milking parlour according to claim 2, wherein the electronic control system is adapted to reduce the speed at which the platform moves in response to a determination that, in use, a teat of a cow standing in the milking stall will be beyond the reach of the robotic manipulation device before a teat cup has been attached to said teat by said device.

5. A milking parlour according to claim 2, wherein,
said milking stall is one of a plurality of milking stalls, the plurality of milking stalls being provided on the moveable platform so as to move, in use, one after another past the robotic manipulation device, and
the electronic control system is adapted to set the speed of movement of the platform so that, for an average rate of servicing a milking stall by the robotic manipulation device, said device completes servicing a stall when the next milking stall on the platform moves within reach of said device.

6. A milking parlour according to claim 2, wherein,
the electronic control system is adapted to:
i) continually determine a current rate at which the robotic manipulation device attaches the teat cups to teats of an animal positioned in the milking stall, and
ii) in response to the determined current rate, to continually determine a required movement of the platform and control the platform to move in the manner determined to be the requirement movement.

7. A milking parlour, comprising:
a robotic manipulation device;
a milking stall provided on a platform moveable relative to the robotic manipulation device; and
an electronic control system i) adapted to monitor a rate at which the robotic manipulation device attaches teat cups to teats of an animal positioned in the milking stall, and ii) adapted to vary movement of rotation of the platform in response to the monitored rate at which the robotic manipulation device attaches teat cups to teats of an animal positioned in the milking stall, wherein,
the electronic control system comprises a sensor past which the platform moves in use, and
the sensor is adapted for detecting a repetition of pattern in a repeating pattern provided on the platform so as to allow a determination of the speed of movement of the platform.

8. A milking parlour according to claim 7, wherein the repeating pattern comprises an irregularity which interrupts the repetition of the repeating pattern such that the irregularity is detectable by the detector means so as to allow the movement monitoring system to determine the position of the platform.

9. A milking parlour according to claim 7, wherein the detector means is adapted to detect the repetition in the repeating pattern at two separate locations within the repeating pattern, wherein said locations are spaced from one another by a distance not wholly divisible by the length of a single pattern, or by a whole multiple of said length, so as to allow the movement monitoring system to determine the direction of movement of the platform.

10. A milking parlour according to claim 7, wherein the repeating pattern comprises first and second repeating patterns offset relative to one another so as to allow the movement monitoring system to determine the direction of movement of the platform by comparing the repetition of each of the first and second repeating patterns as detected by the detector.

11. A method of operating a milking parlour having a robotic manipulation device and a stall provided on a platform moveable relative to the robotic manipulation device, the method comprising the steps of:
monitoring a partial performance of the robotic manipulation device in completing servicing the milking stall; and
varying the movement of the platform, during use thereof, in response to the monitored partial performance.

12. A method according to claim 11, wherein the movement varied is the speed at which the platform passes the robotic manipulation device.

13. A method according to claim 12, wherein the speed at which the platform moves is reduced in response to a determination that the milking stall has moved to a predetermined position relative to the robotic manipulation device without a predetermined teat cup having been attached to a teat of a cow standing in the milking stall.

14. A method according to claim 13, wherein the speed at which the platform moves is reduced in response to a determination that a teat of a cow standing in the milking stall will be beyond reach of the robotic manipulation device before a teat cup has been attached to said teat by said device.

15. A method according to claim 11, wherein,
the milking stall is one of a plurality of milking stalls, the plurality of milking stalls being provided on the moveable platform so as to move, in use, one after another past the robotic manipulation device; and
wherein the method further comprises the step of:
setting the speed of movement of the platform so that, for an average rate of servicing a milking stall by the robotic manipulation device, the device completes servicing a stall when the next milking stall on the platform moves within reach of said device, wherein servicing the stall includes attaching all required teat cups to an animal being serviced in the stall, and the platform rotation speed is determined by the monitored robotic manipulation device's rate in attaching the teat cups to the animal being serviced in the stall.

16. A method according to claim 11, wherein the performance of the robotic manipulation device is the rate at which teat cups are attached to a cow standing in the milking stall.

17. A method according to claim 11, wherein the current performance of the robotic manipulation device is continually determined and, in response to the determined performance of said device, a required movement of the platform is continually determined and the platform controlled to move in the manner determined to be the required movement.

* * * * *